United States Patent
Kim et al.

(10) Patent No.: US 10,984,265 B2
(45) Date of Patent: Apr. 20, 2021

(54) METHOD AND APPARATUS FOR ESTIMATING FRONT OBSTACLE DETECTION DISTANCE

(71) Applicants: Hyundai Motor Company, Seoul (KR); Kia Motors Corporation, Seoul (KR)

(72) Inventors: Byoung Kwang Kim, Yongin-si (KR); Jae Hwan Jang, Suwon-si (KR); Jin Hak Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 117 days.

(21) Appl. No.: 16/406,217

(22) Filed: May 8, 2019

(65) Prior Publication Data
US 2020/0193180 A1 Jun. 18, 2020

(30) Foreign Application Priority Data
Dec. 17, 2018 (KR) .................... 10-2018-0163149

(51) Int. Cl.
*G06K 9/00* (2006.01)
*G06T 7/536* (2017.01)
*G06T 7/73* (2017.01)

(52) U.S. Cl.
CPC .......... *G06K 9/00805* (2013.01); *G06T 7/536* (2017.01); *G06T 7/73* (2017.01); *G06T 2207/30244* (2013.01); *G06T 2207/30261* (2013.01)

(58) Field of Classification Search
None
See application file for complete search history.

(56) References Cited

U.S. PATENT DOCUMENTS

2016/0180531 A1* 6/2016 Lessmann ............... G06T 7/246
 382/103
2017/0206425 A1* 7/2017 Iida .................... G06K 9/00791

\* cited by examiner

*Primary Examiner* — Jianxun Yang
(74) *Attorney, Agent, or Firm* — Slater Matsil, LLP (57) ABSTRACT

A method of estimating a front obstacle detection distance includes detecting an obstacle from a front image of a vehicle, extracting coordinates of a lower end portion of a detection box of the detected obstacle, calculating a projected line on real world coordinates based on the extracted coordinates of the lower end portion, searching for a point or a line through which the projected line passes on a detailed map, and calculating a distance to the point or the line through which the projected line passes on the detailed map from a position of the vehicle.

20 Claims, 8 Drawing Sheets

METHOD AND APPARATUS FOR ESTIMATING FRONT OBSTACLE DETECTION DISTANCE

CROSS-REFERENCE TO RELATED APPLICATIONS

This application claims priority to Korean Patent Application No. 10-2018-0163149, filed on Dec. 17, 2018, which application is hereby incorporated herein by reference.

TECHNICAL FIELD

The present invention relates to a method and apparatus for estimating a front obstacle detection distance.

BACKGROUND

In general, advanced driver assistance system (ADAS) technology of helping driving of a driver of a vehicle has been increasingly developed. In addition, the demand for image-based driver assistance apparatuses has increased due to generality and economy thereof.

Conventional technology of estimating a distance between vehicles using an image formed by capturing a front side of a vehicle uses installation information of a camera that photographs a vehicle and the area or position of a front vehicle detected from the image. However, when a vehicle is position on an inclined road surface, a distance from a front obstacle is estimated without consideration of an inclination degree of the vehicle, and thus, the reliability of the result value is degraded.

Accordingly, there is a need for technology of applying altitude information of a road contained in a detailed map to increase accuracy of estimating a detected distance from a front obstacle recognized by a camera when there is an altitude difference between a vehicle and an obstacle.

SUMMARY

The present invention relates to a method and apparatus for estimating a front obstacle detection distance. Particular embodiments relate to a method of enhancing the accuracy of estimating a detection distance of a front obstacle recognized by a camera by applying altitude information of a road, included in a detailed map.

For example, embodiments of the present invention can provide a method of enhancing the accuracy of estimating a detection distance of a front obstacle recognized by a camera by applying altitude information of a road, included in a detailed map.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

As embodied and broadly described herein, a method of estimating a front obstacle detection distance includes detecting an obstacle from a front image of a vehicle, extracting coordinates of a lower end portion of a detection box of the detected obstacle, calculating a projected line on real world coordinates based on the extracted coordinates of the lower end portion, searching for a point or a line through which the projected line passes on a detailed map, and calculating a distance to the point or the line through which the projected line passes on the detailed map from a position of the vehicle In some embodiments, an apparatus for estimating a front obstacle detection distance may include a camera configured to provide a front image of a vehicle, a position information provision unit configured to provide position information of the vehicle, a detailed map provision unit configured to provide a detailed map based on the position information, and a controller configured to calculate a distance from an object positioned in front of the vehicle, wherein the controller detects an obstacle from a front image of the vehicle, extracts coordinates of a lower end portion of a detection box of the detected obstacle, calculates a projected line on real world coordinates based on the extracted coordinates of the lower end portion, searches for a point or a line through which the projected line passes on a detailed map, and calculates a distance to the point or the line through which the projected line passes on the detailed map from a position of the vehicle.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF ILLUSTRATIVE EMBODIMENTS

Reference will now be made in detail to apparatuses and various methods according to the exemplary embodiments of the present invention, examples of which are illustrated in the accompanying drawings. The suffixes "module" and "unit" of elements herein are used for convenience of description and thus can be used interchangeably and do not have any distinguishable meanings or functions.

In the description of exemplary embodiments, it will be understood that, when an element is referred to as being "on" or "under" or "before" or "after" another element, the element can be directly adjacent to the other element, or intervening elements may also be present.

It will be understood that, although the terms "first", "second", "A", "B", "(a)", "(b)", etc. may be used herein to describe various elements of the present invention, these terms are only used to distinguish one element from another element, and the essential order or sequence of the corresponding elements is not limited by these terms. It will be understood that when one element is referred to as being "connected to", "coupled to", or "accessing" another element, the one element may be "connected to", "coupled to", or "access" another element via a further element, or the one element may be directly connected to or directly access the other element.

The terms "comprises", "includes", and "has" when used herein should be interpreted not to exclude other elements but to further include such other elements since the corresponding elements may be included unless mentioned otherwise. All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings in the related art from the context. Unless differently defined in the present invention, such terms should not be interpreted in an ideal or excessively formal manner.

Figure 1:
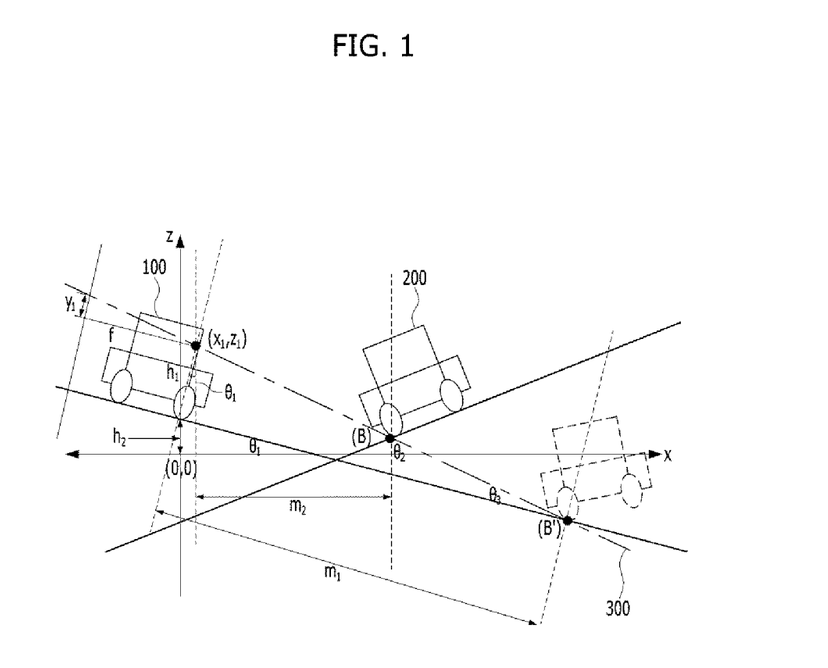
FIG. 1 is a conceptual diagram showing a detection distance estimation method of a front obstacle according to an embodiment of the present invention.

FIG. 1 is a conceptual diagram showing a detection distance estimation method of a front obstacle 200 according to an embodiment of the present invention.

As shown in FIG. 1, a front side of a driving vehicle 100 may be photographed, the captured image may be analyzed, a position of the front obstacle 200 may be extracted from the captured image, and a distance between the vehicle and the obstacle 200 may be calculated based on the calculated position of the obstacle 200.

According to an embodiment, when the vehicle 100 is positioned on a land with an altitude difference, if the vehicle 100 detects the obstacle 200, a detection distance estimation apparatus 110 of the front obstacle 200 may calculate a distance from the obstacle 200 without consideration of an altitude. In this case, the detection distance estimation apparatus 110 of the front obstacle 200 may calculate a distance from the obstacle 200 assuming that the obstacle 200 is horizontally positioned with respect to a road surface on which the vehicle 100 is positioned, and accordingly may estimate an expected distance $m_1$ assuming that the obstacle 200 is positioned on expected coordinates B'.

However, the obstacle 200 is positioned on actual coordinates B that are different from the expected coordinates, and thus, needs to estimate a detection distance $m_2$ based on actual positions of the vehicle 100 and the obstacle 200 using the detection distance estimation method of the front obstacle 200 according to the present invention.

To this end, the detection distance estimation apparatus 110 of the front obstacle 200 may receive an image captured by photographing from a front side of the vehicle 100 using a camera installed in the vehicle 100. An image taken looking out from the front side of the vehicle is referred to herein as a front image of the vehicle. The detection distance estimation apparatus 110 of the front obstacle 200 may detect the obstacle 200 required to measure a distance from the front image received from the camera. In this case, the obstacle 200 may be the vehicle 100 that is positioned in a front side.

For example, the detection distance estimation apparatus 110 of the front obstacle 200 may extract a detection box indicating that the obstacle 200 is the vehicle 100 from a predetermined search region of the received front image and may extract coordinates of a lower end of the extracted detection box.

In this case, the detection box may be feature data of a portion of the vehicle 100, which is selected from pre-stored feature data of the vehicle 100, and here, the selected feature data of the portion of the vehicle 100 may correspond to a feature indicating an outline of a lower end portion of the vehicle 100.

Then, the detection distance estimation apparatus 110 of the front obstacle 200 may calculate an equation of a projected line 300 based on position information in the image and a position of a camera of the vehicle 100. The equation of the projected line 300 may be calculated based on real world coordinates. In this case, the projected line 300 may be a line that coordinates of the camera and coordinates of a lower end portion of the detection box.

To this end, the detection distance estimation apparatus 110 of the front obstacle 200 may calculate the coordinates of the camera in order to calculate the equation of the projected line 300. The position of the camera may be calculated based on the pre-stored camera installation information. The camera position will be described below in detail with reference to FIG. 2.

Then, the detection distance estimation apparatus 110 of the front obstacle 200 may calculate an inclination of the projected line 300 based on the coordinates of the camera. The inclination of the projected line 300 will be described below in detail with reference to FIG. 3.

Then, the detection distance estimation apparatus 110 of the front obstacle 200 may calculate the equation of the projected line 300 based on the inclination of the projected line 300. The equation of the projected line 300 will be described below in detail with reference to FIG. 4.

Then, the detection distance estimation apparatus 110 of the front obstacle 200 may search for a point or a line through which the projected line passes on a detailed map. The projected line 300 on the detailed map will be described below in detail with reference to FIG. 5.

The detection distance estimation apparatus 110 of the front obstacle 200 may calculate a distance to the point through which the projected line passes on the detailed map from a position of the vehicle 100.

The detection distance estimation apparatus 110 of the front obstacle 200 may calculate a distance from the obstacle 200 using a distance function and the equation of the projected line 300. The distance from the obstacle 200 will be described below in detail with reference to FIG. 6.

Figure 2:
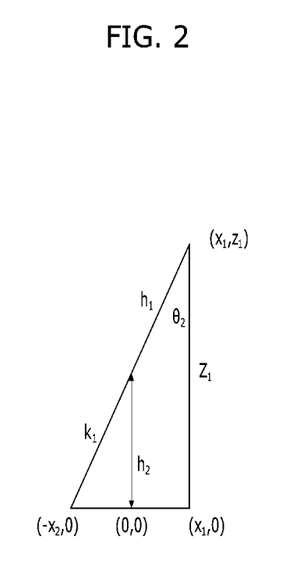
FIG. 2 is a conceptual diagram for calculation of height information of a camera on real world coordinates according to an embodiment of the present invention.

FIG. 2 is a conceptual diagram for calculation of height information of a camera on real world coordinates according to an embodiment of the present invention.

Referring to FIG. 2, the detection distance estimation apparatus 110 of the front obstacle 200 may calculate coordinates of the camera of the vehicle 100 in order to calculate the equation of the projected line 300 on real world coordinates.

In this case, a position of a front wheel of the vehicle 100 on real world coordinates may be assumed to be the origin (0.0), f may be a focal length of the camera, and an optical axis of the camera may be parallel to a major axis of the vehicle 100.

In this case, the detection distance estimation apparatus 110 of the front obstacle 200 may calculate a position of the camera on the real world coordinates based on a pre-stored installation height $h_1$ of the camera.

In this case, the installation height $h_1$ of the camera may be a distance to the camera from the position of the front wheel of the vehicle 100. For example, the installation height $h_1$ of the camera may be a perpendicular height to the camera from a road surface on which the vehicle 100 is position.

Accordingly, the detection distance estimation apparatus 110 of the front obstacle 200 may calculate coordinates ($x_1$, $z_1$) of the camera according to Expression 1 below.

$$\cos\theta_1 = \frac{z_1}{k_1 + h_1} = \frac{h_2}{k_1}$$ [Expression 1]
$$k_1 = \frac{h_2}{\cos\theta_1}$$
$$z_1 = \cos\theta_1\left(\frac{h_2}{\cos\theta_1} + h_1\right)$$
$$= h_2 + h_1\cos\theta_1$$
$$\frac{x_2}{h_2} = \frac{x_1 + x_2}{z_1}$$
$$x_2 = h_2\tan\theta_1$$
$$x_1 = x_2\left(\frac{z_1 - h_2}{h_2}\right) = \tan\theta_1(z_1 - h_2)$$

In this case, $x_1$ is a distance between a camera and the origin in an x-axis direction, $z_1$ is a distance between the camera and the origin in a z-axis direction, $h_1$ is a perpendicular distance to a road surface from a camera, $h_2$ is a distance to the road surface from the origin, $\theta_1$ is an inclination of the road surface, and $x_2$ is an intersection point between an extension line of $h_1$ and the x axis.

Accordingly, the detection distance estimation apparatus 110 of the front obstacle 200 may calculate coordinates ($x_1$, $z_1$) of the camera position in the vehicle 100 based on an inclination of a road surface and the height of the camera.

Figure 3:
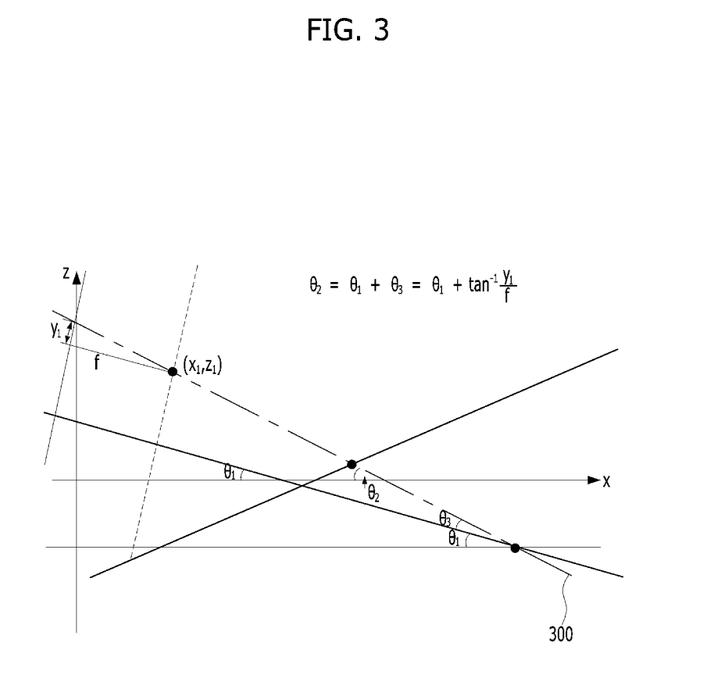
FIG. 3 is a diagram showing a method of calculating an inclination of a projected line according to an embodiment of the present invention.
Figure 4:
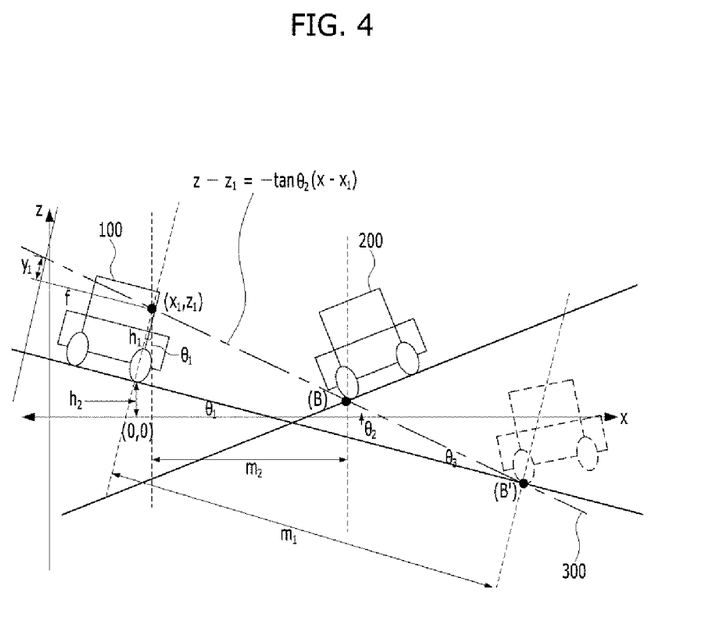
FIG. 4 is a diagram showing a method of calculating an equation of a projected line according to an embodiment of the present invention.

FIG. 3 is a diagram showing a method of calculating an inclination of a projected line according to an embodiment of the present invention. FIG. 4 is a diagram showing a method of calculating an equation of a projected line according to an embodiment of the present invention.

Referring to FIGS. 3 and 4, the detection distance estimation apparatus 110 of the front obstacle 200 may calculate an angle between the projected line 300 and the earth axis when coordinates of the camera are ($x_1$, $z_1$).

That is, an inclination of the projected line 300 may be calculated according to Expression 2 below.

$$\theta_2 = \theta_1 + \theta_3 = \theta_1 + \tan^{-1}\frac{y_1}{f}$$ [Expression 2]

In this case, $\theta_1$ is an inclination of a road surface, $\theta_2$ is an inclination of the projected line 300, $\theta_3$ is an angle between an extension line of the inclination of the road surface and the projected line 300, f is a focal length of the camera, and $y_1$ corresponds to information on a height at which an image is formed in an image sensor of the camera.

The detection distance estimation apparatus 110 of the front obstacle 200 may calculate the equation of the projected line 300 based on the inclination of the projected line 300.

That is, the equation of the projected line 300 may be calculated according to Expression 3 below.

$$z - z_1 = -\tan\theta_2(x - x_1)$$ [Expression 3]

In this case, $z_1$ is a distance between the camera and the origin in a z-axis direction and $x_1$ is a distance between the camera and the origin in an x-axis direction.

Figure 5:
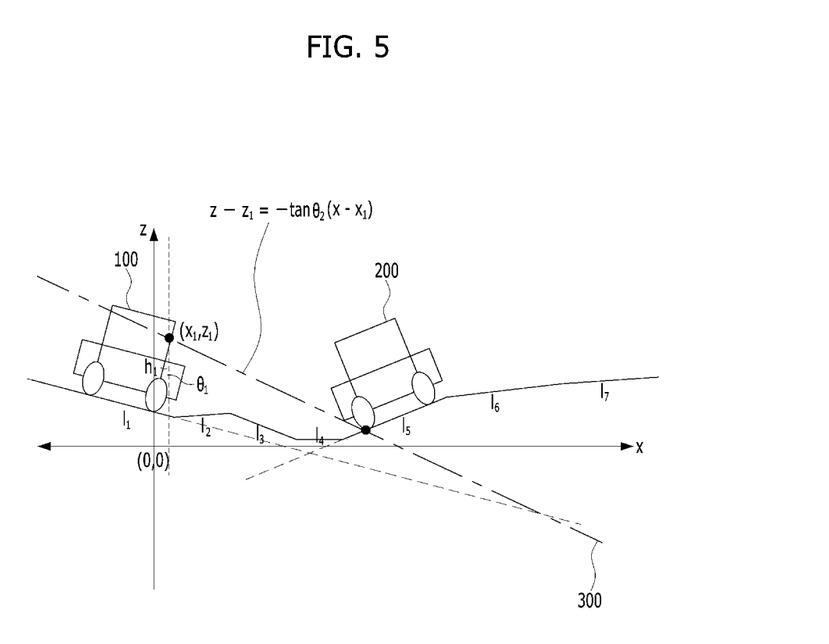
FIG. 5 is a diagram showing a method of searching for a point or a line through which a projected line passes on a detailed map according to an embodiment of the present invention.
Figure 6:
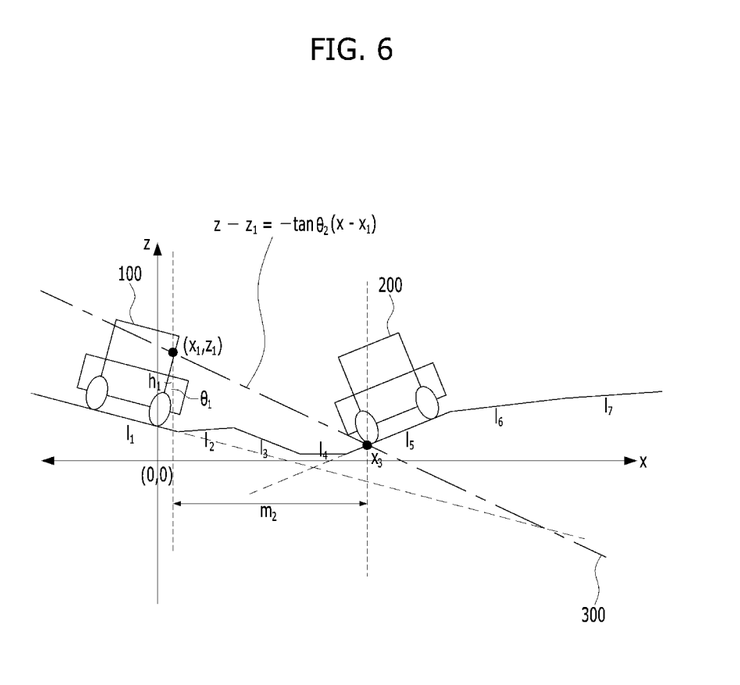
FIG. 6 is a diagram showing a method of calculating a distance to a point through which a projected line passes on a detailed map according to an embodiment of the present invention.

FIG. 5 is a diagram showing a method of searching for a point or a line through which a projected line passes on a detailed map according to an embodiment of the present invention. FIG. 6 is a diagram showing a method of calculating a distance to a point through which a projected line passes on a detailed map according to an embodiment of the present invention.

Referring to FIGS. 5 and 6, the detection distance estimation apparatus 110 of the front obstacle 200 may acquire altitude information based on a position of the vehicle 100. Accordingly, the detection distance estimation apparatus 110 of the front obstacle 200 may generate a line that connects two points to each other based on a direction in which the camera is directed based on the vehicle 100. In this case, the line may include a plurality of lines 11, 12, 13, 14, 15, 16, and 17 based on preset altitude information.

The detection distance estimation apparatus 110 of the front obstacle 200 may search for a line at which a line from the center of the vehicle 100 and the projected line 300 cross each other among the generated lines.

In this case, when there is a straight line at which the line from the center of the vehicle 100 and the projected line 300 cross each other, coordinates of the straight line in an x-axis direction may be obtained based on the equation of the projected line 300. That is, the detection distance estimation apparatus 110 of the front obstacle 200 may estimate a detection distance according to Expression 4 below.

$$m_2 = x_3 - x_1$$ [Expression 4]

In this case, $m_2$ is a detection distance based on actual positions of the vehicle 100 and the obstacle 200, $x_1$ is a distance between a camera and the origin in the x-axis direction, and $x_3$ is an x-axis direction distance of a point at which the line from the center of the vehicle 100 and the projected line 300 cross each other.

Figure 7:
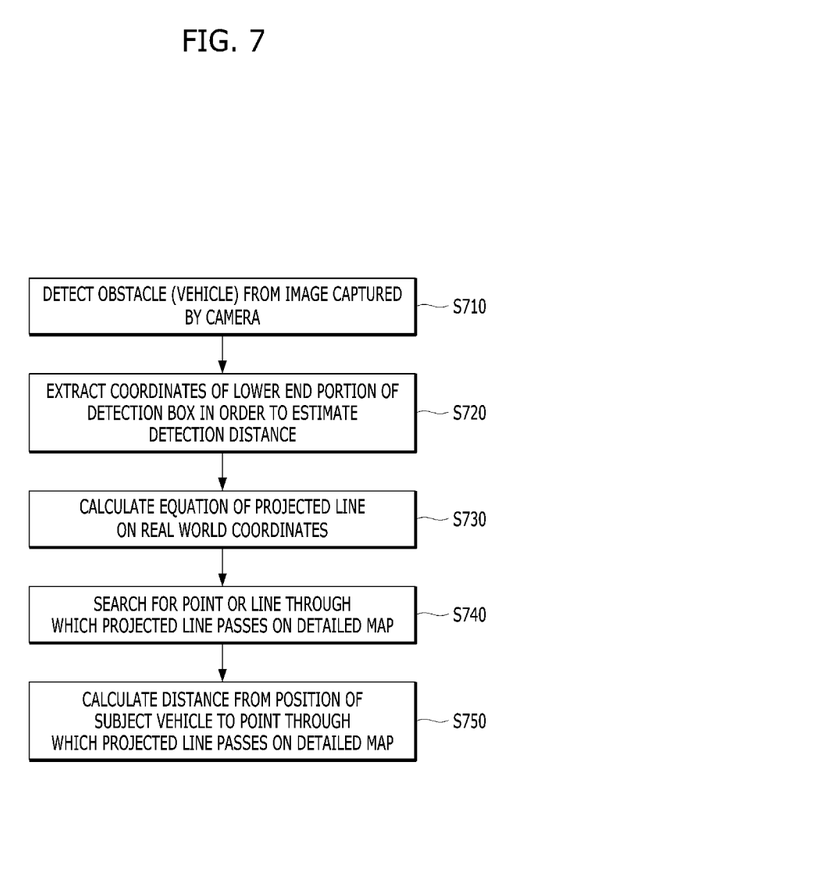
FIG. 7 is a flowchart showing a detection distance estimation method of a front obstacle according to an embodiment of the present invention.

FIG. 7 is a flowchart showing a detection distance estimation method of the front obstacle 200 according to an embodiment of the present invention.

Referring to FIG. 7, the detection distance estimation method of the front obstacle 200 may be performed by the detection distance estimation apparatus 110 of the front obstacle 200, which is described above with reference to FIGS. 1 to 6.

In some embodiments, the detection distance estimation apparatus 110 of the front obstacle 200 may detect the obstacle 200 from an image captured by the camera (S710).

After operation S710, the detection distance estimation apparatus 110 of the front obstacle 200 may extract coordinates of a lower end portion of a detection box in order to estimate a detection distance via the camera (S720). In this case, the detection distance estimation apparatus 110 of the front obstacle 200 may extract the detection box indicating that the front obstacle 200 is the vehicle 100 from a predetermined search region from the received front image and may extract the coordinates of the lower end portion from the extracted detection box.

After operation S720, the detection distance estimation apparatus 110 of the front obstacle 200 may calculate the equation of the projected line 300 on real world coordinates (S730). To this end, the detection distance estimation apparatus 110 of the front obstacle 200 may calculate coordinates of the camera in order to calculate the equation of the projected line 300. Then, the detection distance estimation apparatus 110 of the front obstacle 200 may calculate an inclination of the projected line 300 based on the coordinates of the camera.

After operation S730, the detection distance estimation apparatus 110 of the front obstacle 200 may search for a point or a line through which the projected line 300 passes on a detailed map (S740). To this end, the detection distance estimation apparatus of the front obstacle 200 may search for a line at which a line from the center of the vehicle 100 and the projected line 300 cross each other among the generated lines.

After operation S740, the detection distance estimation apparatus 110 of the front obstacle 200 may calculate a distance to the point through which the projected line 300 passes on the detailed map, from a position of the vehicle 100 (S750).

Figure 8:
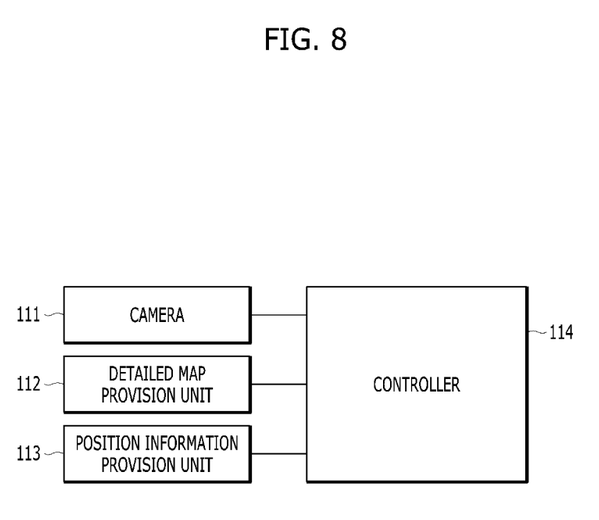
FIG. 8 is a block diagram showing a detection distance estimation apparatus of a front obstacle according to an embodiment of the present invention.

FIG. 8 is a block diagram showing a detection distance estimation apparatus of the front obstacle 200 according to an embodiment of the present invention.

The detection distance estimation apparatus 110 of the front obstacle 200 may include a camera 111, a detailed map provision unit 112, a position information provision unit 113, and a controller 114.

The camera 111 may be installed in the vehicle 100 and may acquire a surrounding image (a front image, a rear image, a lateral image, and so on) of the vehicle 100. The camera may include a single camera, a 3D camera, an omnidirectional camera, a monocular camera, or the like. The camera 111 may include an image sensor that detect obstacle information and converts the information into an electrical image signal.

The camera 111 may an image captured by photographing a front side of the vehicle 100 to a controller.

The detailed map provision unit 112 may provide a detailed map stored in the vehicle 100, and the detailed map may include information obtained by measuring lane position information, altitude information of a lane, and so on.

The position information provision unit 113 may be a module for acquiring a position of the vehicle 100 and may include a global positioning system (GPS), LiDAR, a radio detection and ranging (RADAR) unit, or the like.

The GPS may include a GPS receiver for receiving a navigation message broadcast from a satellite and may receive a current position, latitude, and longitude, or the like of the vehicle 100 using the navigation message (GPS information, GPS signals, and satellite signals).

The position information provision unit 113 may estimate a detailed position of the vehicle 100 based on the current position information of the vehicle 100, received from the GPS, and in-vehicle sensor information (LiDAR information, RADAR information, and lane information). Accordingly, the position information provision unit 113 may provide the estimation result of the detailed position to the controller 114.

The controller 114 may receive an image captured by photographing a front side of the vehicle 100 from the camera 111 installed in the vehicle 100. The controller 114 may detect the obstacle 200 required to measure a distance from the front image received from the camera.

The controller 114 may extract a detection box indicating that the obstacle 200 is the vehicle 100, from a predetermined search region of the received front image and may extract coordinates of a lower end portion from the extracted detection box.

The controller 114 may calculate the equation of the projected line 300 based on the position information in the image and the camera position of the vehicle 100.

The controller 114 may calculate coordinates of the camera in order to calculate the equation of the projected line 300. The controller 114 may calculate an inclination of the projected line 300 based on the coordinates of the camera. The controller 114 may calculate the equation of the projected line 300 based on the inclination of the projected line 300. Then, the controller 114 may search for a point or a line through which the projected line passes on the detailed map.

The controller 114 may calculate a distance to the point through which the projected line passes on the detailed map from a position of the vehicle 100. The controller 114 may calculate a distance from the obstacle 200 using a distance function and the equation of the projected line 300.

The method and apparatus for estimating a front obstacle detection distance according to the present invention may have the following advantages.

Although a distance from an object recognized by a camera is calculated on the assumption that a ground surface is horizontal, a distance from an obstacle positioned in front of a vehicle may be accurately estimated by lowering a distance error that occurs when the ground surface has an altitude difference.

It will be appreciated by persons skilled in the art that that the effects that could be achieved with the present invention are not limited to what has been particularly described hereinabove and other advantages of the present invention will be more clearly understood from the detailed description.

A system according to embodiments of the invention can be implemented by a processor executing code stored in a memory.

The aforementioned method according to an embodiment may also be embodied as computer readable code on a computer readable recording medium. Examples of the computer readable recording medium include read-only memory (ROM), random-access memory (RAM), CD-ROMs, magnetic tapes, floppy disks, optical data storage devices, etc. The computer readable recording medium may also be distributed over network coupled computer systems so that the computer readable code is stored and executed in a distributed fashion. Also, functional programs, code, and code segments for accomplishing the aforementioned method may be easily construed by programmers skilled in the art to which the present invention pertains.

What is claimed is:

1. A method of estimating a front obstacle detection distance, the method comprising:
   detecting an obstacle from a front image of a vehicle;
   extracting coordinates of a lower end portion of a detection box of the detected obstacle;
   calculating a projected line on real world coordinates based on the extracted coordinates of the lower end portion;
   searching for a point or a line through which the projected line passes on a detailed map; and
   calculating a distance to the point or the line through which the projected line passes on the detailed map from a position of the vehicle;
   wherein calculating the projected line comprises:
   calculating an inclination of the projected line;
   calculating an equation of the projected line based on the inclination of the projected line; and calculating an angle between the projected line and an earth axis according to Expression 2 based on the projected line and the inclination of a road surface on which the vehicle is positioned, wherein Expression 2 comprises:

$$\theta_2 = \theta_1 + \theta_3 = \theta_1 + \tan^{-1}\frac{y_1}{f}$$

where $\theta_1$, is an inclination of the road surface, $\theta_2$ is an inclination of the projected line, $\theta_3$ is an angle between an extension line of the inclination of the road surface and the projected line, f is a focal length of a camera installed in the vehicle, and $y_1$ corresponds to information on a height at which an image is formed in an image sensor of the camera.

2. The method of claim 1, further comprising calculating coordinates of the camera on the real world coordinates.

3. The method of claim 2, wherein calculating the coordinates of the camera comprises calculating the coordinates of the camera according to Expression 1 below based on an installation height of the camera:

$$\cos\theta_1 = \frac{z_1}{k_1+h_1} = \frac{h_2}{k_1} \qquad [\text{Expression 1}]$$

$$k_1 = \frac{h_2}{\cos\theta_1}$$

$$z_1 = \cos\theta_1\left(\frac{h_2}{\cos\theta_1}+h_1\right)$$

$$= h_2 + h_1\cos\theta_1$$

$$\frac{x_2}{h_2} = \frac{x_1+x_2}{z_1}$$

$$x_2 = h_2\tan\theta_1$$

$$x_1 = x_2\left(\frac{z_1-h_2}{h_2}\right) = \tan\theta_1(z_1-h_2)$$

where $x_1$ is a distance between the camera and the origin in an x-axis direction, $z_1$ is a distance between the camera and the origin in a z-axis direction, $h_1$ is a perpendicular distance to the road surface from the camera, $h_2$ is a distance to the road surface from the origin, $\theta_1$ is an inclination of the road surface, and $x_2$ is an intersection point between an extension line of $h_1$ and the x axis.

4. The method of claim 1, wherein calculating the equation of the projected line comprises calculating the equation of the projected line according to Expression 3 below:

[Expression 3] $z-z_1 = -\tan\theta_2(x-x_1)$ where $z_1$, is a distance between the camera and the origin in a z-axis direction and $x_1$, is a distance between the camera and the origin in an x-axis direction.

5. The method of claim 1, wherein searching for the point where the line comprises:
generating a line that connects coordinates, based on preset altitude information on the detailed map; and
searching for a point at which the line and the projected line cross each other.

6. The method of claim 5, wherein calculating the distance to the point or the line comprises:
calculating the real world coordinates of an intersection point based on the altitude information; and
calculating a distance between the vehicle and the obstacle based on the real world coordinates.

7. The method of claim 6, wherein calculating the distance between the vehicle and the obstacle comprises calculating the distance between the vehicle and the obstacle according to Expression 4 below:
[Expression 4] $m_2=x_3-x_1$ where $m_2$ is a detection distance based on actual positions of the vehicle and the obstacle, $x_1$ is a distance between the camera and the origin in the x-axis direction, and $x_3$ is an x-axis direction distance of a point at which the line from the center of the vehicle and the projected line cross each other.

8. An apparatus for estimating a front obstacle detection distance, the apparatus comprising:
a camera installed in a vehicle, the camera configured to provide a front image of the vehicle;
a position information provision unit configured to provide position information of the vehicle;
a detailed map provision unit configured to provide a detailed map based on the position information; and
a controller configured to calculate a distance from an object positioned in front of the vehicle,
wherein the controller is configured to detect an obstacle from the front image of the vehicle, to extract coordinates of a lower end portion of a detection box of the detected obstacle, to calculate a projected line on real world coordinates based on the extracted coordinates of the lower end portion, to search for a point or a line through which the projected line passes on the detailed map, to calculate a distance to the point or the line through which the projected line passes on the detailed map from a position of the vehicle, to calculate an inclination of the projected line and to calculate an equation of the projected line based on the inclination of the projected line, and to calculate an angle between the projected line and an earth axis according to Expression 2 based on the projected line and the inclination of a road surface on which the vehicle is positioned; and
wherein Expression 2 comprises:

$$\theta_2 = \theta_1 + \theta_3 = \theta_1 + \tan^{-1}\frac{y_1}{f}$$

where $\theta_1$ is an inclination of the road surface, $\theta_2$ is an inclination of the projected line, $\theta_3$ is an angle between an extension line of the inclination of the road surface and the projected line, f is a focal length of the camera, and $y_1$ corresponds to information on a height at which an image is formed in an image sensor of the camera.

9. The apparatus of claim 8, wherein the controller is configured to calculate coordinates of the camera in the real world coordinates.

10. The apparatus of claim 9, wherein the controller is configured to calculate coordinates of the camera according to Expression 1 above based on an installation height of the camera, $$\cos\theta_1 = \frac{z_1}{k_1+h_1} = \frac{h_2}{k_1} \qquad [\text{Expression 1}]$$

$$k_1 = \frac{h_2}{\cos\theta_1}$$

-continued $$z_1 = \cos\theta_1\left(\frac{h_2}{\cos\theta_1} + h_1\right)$$
$$= h_2 + h_1\cos\theta_1$$
$$\frac{x_2}{h_2} = \frac{x_1 + x_2}{z_1}$$
$$x_2 = h_2\tan\theta_1$$
$$x_1 = x_2\left(\frac{z_1 - h_2}{h_2}\right) = \tan\theta_1(z_1 - h_2)$$

where $x_1$ is a distance between the camera and the origin in an x-axis direction, $z_1$ is a distance between the camera and the origin in a z-axis direction, $h_1$ is a perpendicular distance to the road surface from the camera, $h_2$ is a distance to the road surface from the origin, $\theta_1$ is an inclination of the road surface, and $x_2$ is an intersection point between an extension line of $h_1$ and the x axis.

11. The apparatus of claim 8, further comprising a non-transitory computer readable recording medium coupled to the controller and having recorded thereon a program for being executed by the controller.

12. The apparatus of claim 8, wherein the controller is configured to calculate the equation of the projected line according to Expression 3 below:
[Expression 3] $z-z_1 = -\tan\theta_2(X-x_1)$ where $z_1$ is a distance between the camera and the origin in a z-axis direction and $x_1$ is a distance between the camera and the origin in an x-axis direction.

13. The apparatus of claim 8, wherein the controller is configured to generate a line that connects coordinates, based on preset altitude information on the detailed map and searches for a point at which the line and the projected line cross each other.

14. The apparatus of claim 13, wherein the controller is configured to calculate the real world coordinates of an intersection point based on the altitude information and to calculate a distance between the vehicle and the obstacle based on world coordinates.

15. The apparatus of claim 14, wherein the controller is configured to calculate the distance between the vehicle and the obstacle according to Expression 4 below:
[Expression 4] $m_2 = x_3 - x_1$ where $m_2$ is a detection distance based on actual positions of the vehicle and the obstacle, $x_1$ is a distance between the camera and the origin in the x-axis direction, and $x_3$ is an x-axis direction distance of a point at which the line from the center of the vehicle and the projected line cross each other.

16. An apparatus for estimating a front obstacle detection distance, the apparatus comprising:
a camera configured to provide a front image of a vehicle;
a processor coupled to receive the front image from the camera; and
a non-transitory storage medium storing a program to be executed by the processor, the program including instructions to perform the following steps:
detecting an obstacle from the front image of the vehicle;
extracting coordinates of a lower end portion of a detection box of the detected obstacle;
calculating a projected line on real world coordinates based on the extracted coordinates of the lower end portion;
searching for a point or a line through which the projected line passes on a detailed map; and
calculating a distance to the point or the line through which the projected line passes on the detailed map from a position of the vehicle;
wherein calculating the projected line comprises:
calculating an inclination of the projected line;
calculating an equation of the projected line based on the inclination of the projected line: and
calculating an angle between the projected line and an earth axis according to Expression 2 based on the projected line and the inclination of a road surface on which the vehicle is positioned, wherein Expression 2 comprises:

$$\theta_2 = \theta_1 + \theta_3 = \theta_1 + \tan^{-1}\frac{y_1}{f}$$

where $\theta_1$, is an inclination of the road surface, $\theta_2$ is an inclination of the projected line, $\theta_3$ is an angle between an extension line of the inclination of the road surface and the projected line, f is a focal length of the camera, and $y_1$, corresponds to information on a height at which an image is formed in an image sensor of the camera.

17. The apparatus of claim 16, further comprising calculating coordinates of the camera on the real world coordinates.

18. The apparatus of claim 16, wherein calculating the equation of the projected line comprises calculating the equation of the projected line according to Expression 3 below:
[Expression 3] $z-z_1 = -\tan\theta_2(x-x_1)$ where $z_1$ is a distance between the camera and the origin in a z-axis direction and $x_1$ is a distance between the camera and the origin in an x-axis direction.

19. The apparatus of claim 16, wherein searching for the point where the line comprises:
generating a line that connects coordinates, based on preset altitude information on the detailed map; and
searching for a point at which the line and the projected line cross each other.

20. The apparatus of claim 19, wherein calculating the distance to the point or the line comprises:
calculating the real world coordinates of an intersection point based on the altitude information; and
calculating a distance between the vehicle and the obstacle based on the real world coordinates.

* * * * *